United States Patent
Kreidler et al.

(10) Patent No.: US 10,392,716 B2
(45) Date of Patent: Aug. 27, 2019

(54) ELECTROCHEMICAL CELL THAT GENERATES HYDROGEN

(71) Applicant: VARTA Microbattery GmbH, Ellwangen Jagst (DE)

(72) Inventors: Bernd Kreidler, Ellwangen (DE); Bernd Schweinstetter, Dischingen (DE); Uwe Voigt, Essingen (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 21 days.

(21) Appl. No.: 15/708,666

(22) Filed: Sep. 19, 2017

(65) Prior Publication Data

US 2018/0080132 A1 Mar. 22, 2018

(30) Foreign Application Priority Data

Sep. 19, 2016 (EP) .................................... 16189534

(51) Int. Cl.
*C25B 15/04* (2006.01)
*C25B 1/04* (2006.01)
*C25B 15/02* (2006.01)
*C25B 9/08* (2006.01)
*C25B 1/10* (2006.01)
*C25B 9/04* (2006.01)

(52) U.S. Cl.
CPC ................ *C25B 15/04* (2013.01); *C25B 1/04* (2013.01); *C25B 1/10* (2013.01); *C25B 9/04* (2013.01); *C25B 9/08* (2013.01); *C25B 15/02* (2013.01); *Y02E 60/366* (2013.01)

(58) Field of Classification Search
CPC combination set(s) only.
See application file for complete search history.

(56) References Cited

U.S. PATENT DOCUMENTS 3,614,670 A * 10/1971 Wilson .................... H01P 1/387
333/1.1
4,054,726 A * 10/1977 Sauer ...................... H01M 4/06
429/66

(Continued)

FOREIGN PATENT DOCUMENTS

| DE | 3 532 335 | 3/1987 |
| EP | 1325876 | 7/2003 |
| EP | 2 674 623 | 12/2013 |

OTHER PUBLICATIONS

European Search Report dated Jan. 4, 2017, in corresponding European Patent Application No. 16189534.7.

*Primary Examiner* — Kaity V Chandler
(74) *Attorney, Agent, or Firm* — DLA Piper LLP (US)

(57) ABSTRACT

An electrochemical cell that generates hydrogen has an anode including an electrochemically oxidizable substance and an electrode designed for hydrogen generation as a cathode and an aqueous alkaline electrolyte. The anode and the cathode are designed such that the hydrogen generation begins at the cathode as soon the anode and the cathode are electrically connected to one another. At least one resistance foil is adhesively bonded to at least one outer side of the housing which, when it is connected as a load resistance between the anode and the cathode, reduces the current flow between the anode and the cathode and therefore also the gas generation rate.

9 Claims, 3 Drawing Sheets

(56) References Cited

U.S. PATENT DOCUMENTS

| | | | | |
|---|---|---|---|---|
| 5,242,565 | A * | 9/1993 | Winsel | H01M 6/26 |
| | | | | 204/265 |
| 5,486,429 | A | 1/1996 | Thibault | |
| 5,585,142 | A * | 12/1996 | Klein | H01M 4/0435 |
| | | | | 29/623.5 |
| 6,468,692 | B1 * | 10/2002 | Nemoto | H01M 2/08 |
| | | | | 429/171 |
| 6,503,658 | B1 * | 1/2003 | Klein | H01M 2/0267 |
| | | | | 29/623.1 |
| 6,531,242 | B1 * | 3/2003 | Sugimoto | H01M 2/1241 |
| | | | | 429/82 |
| 2003/0111384 | A1 | 6/2003 | Schein et al. | |
| 2006/0228620 | A1 * | 10/2006 | Martinson | H01M 2/0413 |
| | | | | 429/56 |
| 2006/0257701 | A1 * | 11/2006 | Schumm, Jr. | H01M 2/1229 |
| | | | | 429/407 |
| 2009/0081501 | A1 * | 3/2009 | Vu | C01B 3/065 |
| | | | | 429/436 |
| 2013/0143104 | A1 | 6/2013 | Schein et al. | |
| 2014/0056327 | A1 | 2/2014 | Maier et al. | |
| 2016/0233461 | A1 * | 8/2016 | Young | H01M 2/0207 |

* cited by examiner

ELECTROCHEMICAL CELL THAT GENERATES HYDROGEN

TECHNICAL FIELD

This disclosure relates to an electrochemical cell that generates hydrogen, also referred to below as a hydrogen evolution cell.

BACKGROUND

Electrochemical cells that generates hydrogen are known in diverse structural forms. In particular, such cells are frequently constructed as button cells. An exemplary construction of such cells is described in DE 3532335 A1.

Generation of hydrogen is based on an electrochemical reaction in cells as described in DE 3532335 A1. As a current flows through a cell, which comprises a metal such as zinc as the anode, i.e. an electrochemically oxidizable substance, and a catalyst electrode capable of decomposing water as the cathode, hydrogen is formed. Such cell types contain an aqueous alkaline electrolyte as the electrolyte.

Known hydrogen evolution cells comprise a housing having at least one aperture as a gas outlet opening, through which generated hydrogen can escape from the interior of the housing. The aperture is required for operation of the cells. During longer storage, materials such as carbon dioxide or atmospheric oxygen can penetrate into the housing interior and result in undesired chemical reactions therein. For this reason, the at least one aperture is generally covered using a detachable sticker in the form of a label having a small grip tab. Cells protected in this manner are shown, for example, in FIG. 1 of EP 1325876 B1. Before startup of the cells, the detachable sticker is removed for many applications, however. This is because hydrogen generated in the cell has to be able to exit from the housing interior with as few problems as possible. This is not only expedient for proper operation of the cells, but can even be required for safety reasons. In the hydrogen evolution cells known from DE 3532335 A1, in the event of unintentional blockage of the gas outlet opening, pressures can form which are sufficiently high to cause the cells to burst.

There are numerous applications for hydrogen evolution cells as described in DE 3532335 A1. They are used very frequently in conjunction with the dispensing of free-flowing media. Thus, the generated hydrogen can drive, for example, the piston of a grease dispenser, as described in DE 3532335 A1. The use of hydrogen-generating cells to dispense disinfectants and fragrances from fragrance dispensers is known from EP 2674623 A1.

In hydrogen evolution cells such as the cells described in DE 3532335 A1 having a zinc anode, the hydrogen evolution generally runs spontaneously when the anode is electrically connected to the cathode. A load resistance connects between the anode and the cathode to set the hydrogen evolution rate. This load resistance is generally a part of a larger device such as, for example, the mentioned fragrance dispensers. The hydrogen evolution cell is used therein. An essentially constant hydrogen evolution then occurs in operation. A subsequent adaptation of the hydrogen evolution rate is only possible with great effort. A replacement or an adaptation of the load resistance is required for this purpose.

It could therefore be helpful to provide hydrogen that enables a hydrogen evolution rate to be adapted later in existing devices such as the mentioned fragrance dispensers, without a load resistance integrated into the devices having to be adapted or replaced for this purpose.

SUMMARY

We provide an electrochemical cell that generates hydrogen including an anode having an electrochemically oxidizable substance; an electrode designed for hydrogen generation as a cathode; an aqueous alkaline electrolyte, wherein the anode and the cathode are designed such that the hydrogen generation begins at the cathode as soon as the anode and the cathode are electrically connected to one another; a housing that encloses an interior in which the anode and the cathode, separated from one another by a separator, are arranged, wherein the housing has at least one aperture through which hydrogen generated at the electrode designed for hydrogen generation can escape from the interior; and at least one resistance foil adhesively bonded to at least one outer side of the housing which, when connected as a load resistance between the anode and the cathode, reduces current flow between the anode and the cathode and therefore the gas generation rate.

DETAILED DESCRIPTION

Figure 1A:
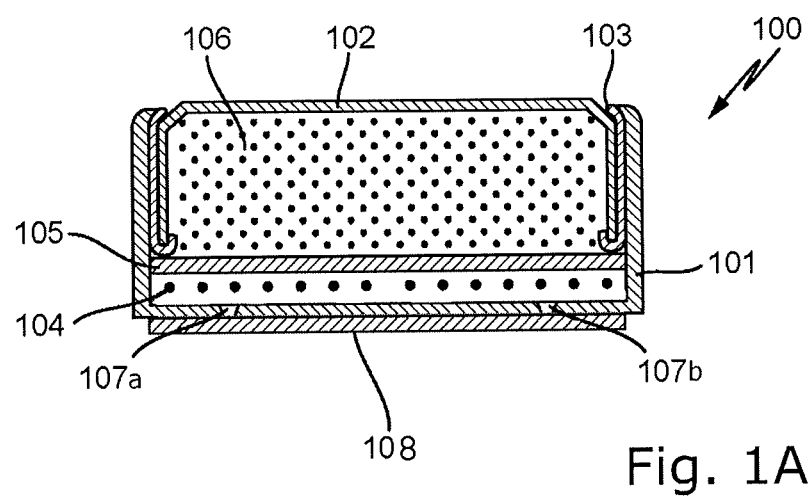
FIG. 1A schematically shows the cross section of a preferred example of an electrochemical cell.

Our cells are used to generate hydrogen. They have an anode comprising an electrochemically oxidizable substance (for example, zinc or magnesium or an alloy of these metals) and an electrode designed for hydrogen generation as a cathode (for example, one of the catalyst electrodes described in DE 3532335 A1). The catalyst electrodes are preferably designed in this case as gas diffusion electrodes having a thin active layer, in which a suitable catalyst is embedded. The subject matter of DE 3532335 A1 is incorporated by reference in that regard.

The electrochemical cells preferably contain an aqueous alkaline electrolyte, for example, potassium hydroxide solution, as an electrolyte.

Hydrogen evolution runs spontaneously when the anode is electrically connected to the cathode. For this purpose, the anode and the cathode are designed such that the hydrogen generation begins at the cathode as soon as the anode and the cathode are electrically connected to one another.

The cells furthermore comprise a housing that encloses an interior in which the anode and the cathode—separated from one another by a separator—are arranged. The housing has an aperture through which hydrogen generated at the electrode designed for hydrogen generation can escape from the interior.

The cells are distinguished in particular in that at least one resistance foil is adhesively bonded to at least one outer side of the housing which, when it is connected as a load resistance between the anode and the cathode, reduces the current flow between the anode and the cathode and therefore also the gas generation rate.

This enables the hydrogen evolution rate in devices such as the fragrance dispensers mentioned at the outset to be adapted later, without a load resistance integrated into the devices having to be adapted or replaced for this purpose. Instead, it is only necessary to replace the hydrogen evolution cell in these devices with our cell, wherein the resistance foil is to be placed so that it connects in series to one of the integrated load resistances during operation of the cell. The gas generation rate can be reduced to a desired value by the at least one resistance foil.

The resistance foil is preferably selected so that the gas generation rate is reduced by at least 1% and at most 99%, particularly preferably by at least 10% and at most 90%.

The resistance foil of a cell particularly preferably has a resistance per unit area of 1 m$\Omega$/□ to 100 k$\Omega$/□, preferably of 1 m$\Omega$/□ to 50 k$\Omega$/□, particularly preferably of 5 m$\Omega$/□ to 50 k$\Omega$/□, in particular of 5 m$\Omega$/□ to 100 $\Omega$/□.

Resistance foils preferably comprise at least one of the following components:
at least one metal layer,
at least one resistance layer, and
at least one adhesive layer.

Particularly preferably, the resistance foil has one of the following layer sequences:
metal layer/adhesive layer
adhesive layer/metal layer/adhesive layer
metal layer/resistance layer/metal layer
adhesive layer/metal layer/resistance layer/metal layer
adhesive layer/metal layer/resistance layer/metal layer/adhesive layer The metal layer preferably consists of copper, aluminum, nickel, cobalt, noble metals such as gold, silver, and platinum, or of an alloy of one of these metals.

The resistance layer is based, for example, on a polymer having defined electrical conductivity, a resistance alloy, or a carbon-based material.

The adhesive layer is preferably formed from an acrylic adhesive or from an epoxy adhesive.

Particularly preferably, adhesive layers are used, which themselves have a limited electrical conductivity and can assume the function of a resistance layer. To produce such adhesive layers, for example, electrically conductive particles or polymer components can be added to an adhesive. For example, silver particles, nickel particles, cobalt particles, brass particles, or bronze particles are suitable.

A resistance foil having the sequence adhesive layer/metal layer/adhesive layer may, if both adhesive layers are made conductive, be adhesively bonded to at least one outer side of the housing of a cell. A further adhesive layer is then available to adhesively bond the cell to an electrical contact or an electronic component, for example.

The resistance foil—including all of its layers—preferably has a thickness of 40 μm to 2000 μm. Within this range, 50 μm to 500 μm, in particular 50 μm to 250 μm, is furthermore preferred. An adhesive layer within the composite generally has a thickness of 10 μm to 100 μm in this case.

Particularly preferably, the cell is designed as a button cell and comprises a cylindrical housing, the outer side of which comprises a flat upper side, a flat lower side, and a circumferential lateral surface. In this case, the housing preferably consists of a cell cup, a cell cover, and a seal, wherein the cell cover is inserted into the cell cup and the seal separates the cell cup and the cell cover from one another. In this state, the bottom of the cell cup forms the flat lower side of the housing while the bottom of the cell cover forms the flat upper side of the housing.

It is preferable for the at least one aperture to be introduced into the bottom of the cell cup or the cell cover. It is particularly preferably introduced into the bottom of the cell cup.

A cell designed as a button cell may comprise at least one resistance foil, particularly preferably precisely one resistance foil, which is adhesively bonded to the flat upper side of its housing.

A cell designed as a button cell may comprise at least one resistance foil, particularly preferably precisely one resistance foil, which is adhesively bonded to the flat lower side of its housing.

A cell designed as a button cell may comprise at least one resistance foil, particularly preferably precisely one resistance foil, which is adhesively bonded to the circumferential lateral surface of its housing.

Preferably, the at least one aperture in the bottom of the cell cup is closed by the resistance foil on the flat lower side of the housing. In this case, the resistance foil covers the at least one aperture and a region of the lower side enclosing the at least one aperture. The resistance foil may thus be used for the same purpose as the above-mentioned detachable sticker, which is known, in the form of a label. In contrast to such labels, however, the resistance foil preferably has at least one intended tear point that tears upon the first startup of the cell due to a pressure forming in the interior as a result of the beginning hydrogen generation and/or at least one passage in the form of a hole or a slot in the region enclosing the aperture.

These two features fundamentally cause the same technical effect. They can therefore be used alternatively to one another or in combination with one another. The cell is effectively protected from the penetration of materials such as carbon dioxide or atmospheric oxygen before its startup both by a resistance foil having the at least one intended tear point and also by a resistance foil having the at least one passage in the form of the hole or slot in the region enclosing the aperture. The resistance foil is therefore used to improve storage stability. At the same time, the at least one intended tear point and the at least one passage in the form of the hole or slot also ensure, however, that hydrogen formed in the cell can escape from the interior, without it previously being necessary to pull off the resistance foil from the outer side of the housing.

If a pressure forms in the interior of the cell during the startup of the cell, in the case of the presence of the resistance foil having the at least one intended tear point, this thus results in tearing of the resistance foil along at least one intended tear point. In the presence of the resistance foil having the at least one passage, hydrogen formed in the cell can escape from the cell through this passage. In general, the pressure arising in the cell interior initially results in slight raising of the resistance foil until hydrogen has made its way from the cell interior through the aperture to the at least one passage. This is because it is generally preferable for the aperture and the at least one passage not to overlap. An overlap would have negative effects on the storage stability of the cell. For this reason, the at least one passage in the form of a hole or a slot is also arranged in the region enclosing the aperture.

The resistance foil particularly preferably covers the bottom of the cell cup or the cell cover completely or nearly completely.

With respect to the term "intended tear point," this is to be understood as a point at which the resistance foil of a cell preferably tears when the resistance foil is subjected to a pressure by hydrogen escaping from the cell. The intended tear point is implemented by targeted material attenuation of the resistance foil at this point. This will be explained in greater detail hereafter.

Preferably, the housing of a cell has more than one aperture. If this is the case, it is thus preferable for each of the apertures to be covered using the resistance foil having the at least one intended tear point and/or the at least one passage in the form of a hole or a slot.

The cell particularly preferably has 2 to 4 apertures.

The aperture/the apertures are generally simple holes introduced into the housing by a drilling or a stamping procedure or by a laser. They can have both a round and also a polygonal shape. This is not critical.

The aperture/apertures preferably have a minimum diameter of not less than 0.1 mm, particularly preferably not less than 0.5 mm, preferably not less than 1.0 mm. It is furthermore preferable for the aperture/apertures to have a diameter of not greater than 1.5 mm.

As already noted above, the intended tear point is preferably implemented by targeted material attenuation of the resistance foil. Preferably, the cell is furthermore characterized by at least one of the following features:

The at least one intended tear point is implemented as a punctiform or linear attenuation of the resistance foil.

The attenuation is induced by perforation along an attenuation line. Perforation along an attenuation line is to be understood in this case as the linear attenuation by perforation of the resistance foil at preferably regular intervals.

The attenuation can also be continuous and free of holes along an attenuation line. Alternatively to the perforation, a targeted material attenuation along an attenuation line can also be induced by an alternative procedure, for example, by an embossing procedure along a line or by targeted material attenuation by thermal or chemical treatment, for example, by a laser or an etching process.

The intended tear point is implemented as a linear attenuation of the resistance foil having curved or circular geometry.

The intended tear point is implemented as a linear attenuation of the resistance foil along one or more straight lines.

If the resistance foil has, in the region enclosing the aperture, the at least one passage in the form of a hole or a slot, the following is thus preferred:

The at least one passage comprises multiple holes and/or slots along a line.

The line is implemented along one or more straight lines or having curved or circular geometry.

Further features and advantages result from the drawings and the following description of the drawings. The examples described hereafter are only used for explanation and better comprehension and are in no way to be understood as restrictive.

FIG. 1A schematically shows the cross section of a preferred example of an electrochemical cell 100.

The preferred example is a button cell. The cell cup 101 and the cell cover 102 inserted therein, from which the housing of the button cell is formed, are shown. The housing has a cylindrical shape. The housing is delimited on the end face by the bottoms of the cell cup 101 and of the cell cover 102, and on the lateral side by the wall of the cell cup 101.

The plastic seal 103, which spatially and electrically separates the cell cup 101 and the cell cover 102 from one another, is arranged between the cell cup 101 and the cell cover 102. The catalyst electrode 104, which is designed for hydrogen generation, is contained in the cell 100 in the form of a flat layer. The planar separator 105 rests directly on the catalyst electrode 104. It separates the catalyst electrode 104 from the anode 106. This contains a metal powder, namely zinc, as an electrochemically oxidizable substance.

The apertures 107a and 107b are incorporated into the bottom of the cell cup 101. The bottom of the cell cup 101 (corresponding to the flat lower side of the housing) is adhesively bonded to the foil 108. This foil completely covers the apertures 107a and 107b and thus protects the interior of the cell 100 from a penetration of carbon dioxide, for example.

The foil 108 is a resistance foil consisting of a copper layer and an adhesive layer. The copper layer has a thickness of approximately 35 µm. The adhesive layer has a thickness of approximately 30 µm. It was formed from an adhesive based on acrylate and has an electrical conductivity. The resistance per unit area of the resistance foil is 5 mΩ/☐.

If the resistance foil 108 is connected as a load resistance between the anode 106 and the cathode 104, this thus reduces the current flow between the anode 106 and the cathode 104 and thus also the gas generation rate.

Figure 1B:
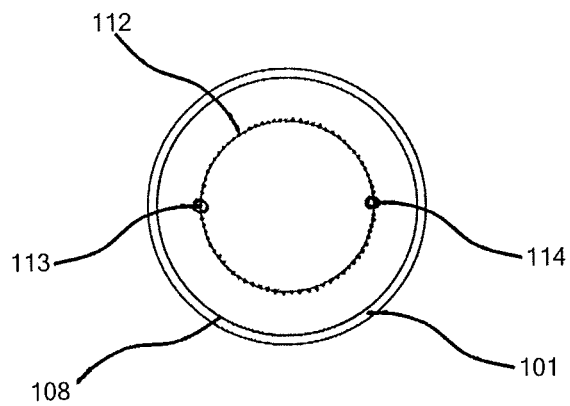
FIG. 1B schematically shows a top view of the bottom of the cell cup of the preferred example of an electrochemical cell shown in FIG. 1A.

FIG. 1B schematically shows a top view of the bottom of the cell cup 101 of the preferred example of an electrochemical cell 100 shown in FIG. 1A. It can be seen here that the foil 108 has the perforated line 112 as the intended tear point. If the cell 100 is put into operation and a current is caused to flow through it, hydrogen is thus formed in the interior of the housing. The foil 108 tears at at least one of the intended tear points 108a and 108b due to the increasing pressure as a result thereof. The generated hydrogen can then exit from the cell unobstructed. The punctiform regions 113 and 114 of the foil 108 are emphasized. In these regions, the foil 108 overlaps with the apertures 107a and 107b.

Figure 1C:
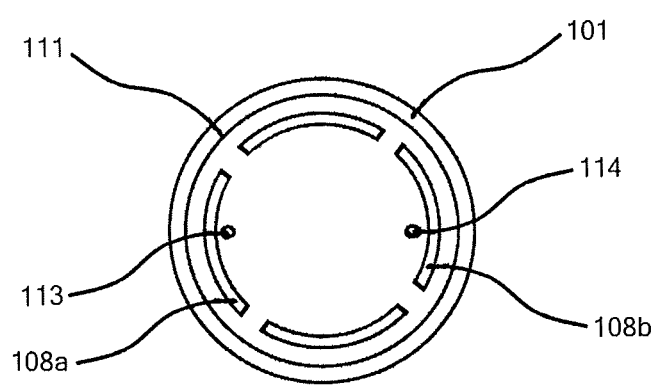
FIG. 1C illustrates a top view of the bottom of a cell cup of a cell, which is structurally equivalent to the cell shown in FIG. 1A.

FIG. 1C illustrates a top view of the bottom of a cell cup 101 of a cell, which is structurally equivalent to the cell shown in FIG. 1 A except for the foil 108. Instead of the foil 108, a foil 111 is shown here, which has the passages 108a and 108b, each in the form of slots arranged in curves, instead of an intended tear point. The punctiform regions 113 and 114 of the foil 111 are emphasized. In these regions, the foil 111 overlaps with the apertures 107a and 107b.

Figure 2:
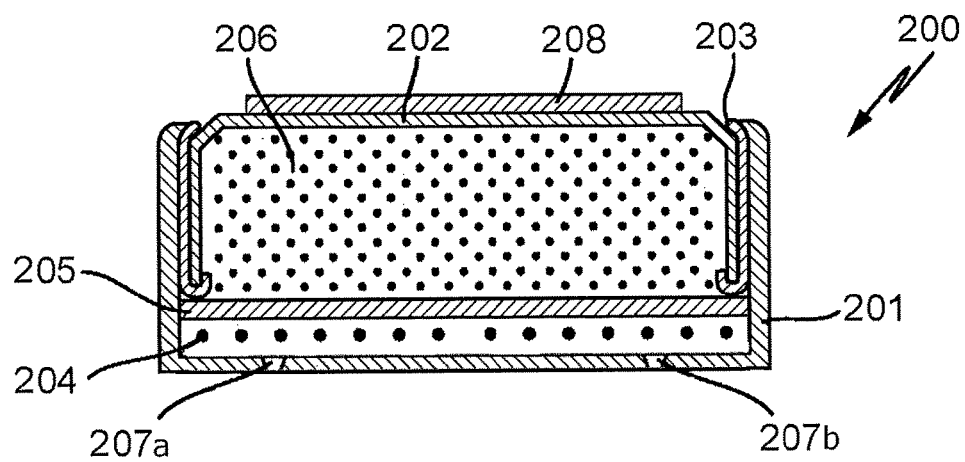
FIG. 2 schematically shows a cross section of an example of one of our electrochemical cells.

The example of an electrochemical cell 200 shown in FIG. 2 is essentially structurally equivalent to the cell shown in FIG. 1A. The cell cup 201, the cell cover 202 inserted therein, the plastic seal 203, the catalyst electrode 204, the planar separator 205, the anode 206, the apertures 207a and 207b, and a resistance foil 208 are shown. All of these cell components do not differ from the corresponding components of the cell 100.

Differences solely relate to the placement of the resistance foil 208. Instead of the foil 108 on the bottom of the cell cup 101, the cell shown in FIG. 2 has the foil 208 on the flat upper side of the cell housing (corresponding to the bottom of the cell cover 202).

Figure 3:
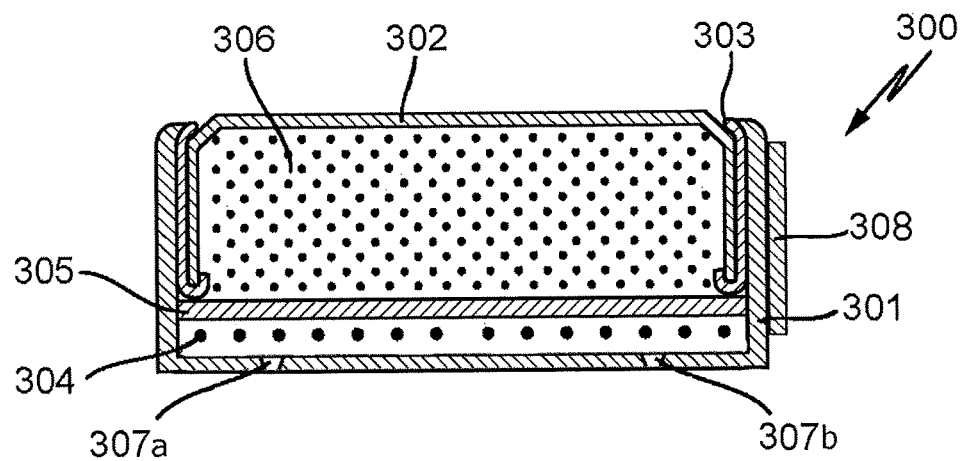
FIG. 3 schematically shows a cross section of another example of one of our electrochemical cells.

The example of an electrochemical cell 300 shown in FIG. 3 is also essentially structurally equivalent to the cell shown in FIG. 1A. The cell cup 301, the cell cover 302 inserted therein, the plastic seal 303, the catalyst electrode 304, the planar separator 305, the anode 306, the apertures 307a and 307b, and a resistance foil 308 are shown. All of these cell components do not differ from the corresponding components of the cell 100.

Differences solely relate to the placement of the resistance foil 308. Instead of the foil 108 on the bottom of the cell cup 101, the cell shown in FIG. 2 has the foil 308 on the circumferential lateral surface of the housing of the button cell.

What is claimed is:

1. An electrochemical cell that generates hydrogen comprising:
    an anode comprising an electrochemically oxidizable substance;
    an electrode designed for hydrogen generation as a cathode;
    an aqueous alkaline electrolyte, wherein the anode and the cathode are designed such that the hydrogen generation begins at the cathode as soon as the anode and the cathode are electrically connected to one another; a housing that encloses an interior in which the anode and the cathode, separated from one another by a separator, are arranged, wherein the housing has at least one aperture through which hydrogen generated at the electrode designed for hydrogen generation can escape from the interior; and
    at least one resistance foil adhesively bonded to at least one outer side of the housing which, when connected as a load resistance between the anode and the cathode, reduces current flow between the anode and the cathode and therefore the gas generation rate.

2. The cell according to claim 1, wherein the resistance foil has a resistance per unit area of 1 m$\Omega$/□ to 100 k$\Omega$/□.

3. The cell according to claim 1, having at least one of:
    the resistance foil comprises at least one metal layer,
    the resistance foil comprises at least one resistance layer,
    the resistance foil comprises at least one adhesive layer,
    the resistance foil has a layer sequence: metal layer/adhesive layer,
    the resistance foil has a layer sequence: adhesive layer/metal layer/adhesive layer,
    the resistance foil has a layer sequence: metal layer/resistance layer/metal layer,
    the resistance foil has a layer sequence: adhesive layer/metal layer/resistance layer/ metal layer, and
    the resistance foil has a layer sequence: adhesive layer/metal layer/resistance layer/ metal layer/adhesive layer.

4. The cell according to claim 3, having at least one of:
    the metal layer consists of copper, aluminum, nickel, cobalt, noble metals such as gold, silver, and platinum, or an alloy of one of these metals,
    the resistance layer is based on a polymer having defined conductivity, a resistance alloy, or a carbon-based material, and
    the adhesive layer is formed from an acrylic adhesive or an epoxy adhesive.

5. The cell according to claim 1, having at least one of:
    the cell is a button cell and comprises a cylindrical housing, an outer side of which comprises a flat upper side, a flat lower side, and a circumferential lateral surface,
    the housing consists of a cell cup, a cell cover, and a seal, wherein the cell cover is inserted into the cell cup and the seal separates the cell cup and the cell cover from one another, and
    the at least one aperture is introduced into the bottom of the cell cup or the cell cover.

6. The cell according to claim 5, having at least one of:
    the cell is a button cell and comprises at least one resistance foil adhesively bonded to the flat upper side of its housing,
    the cell is a button cell and comprises at least one resistance foil adhesively bonded to the flat lower side of its housing, and
    the cell is a button cell and comprises at least one resistance foil adhesively bonded to the circumferential lateral surface of its housing of the button cell.

7. The cell according to claim 6, having at least one of:
    the at least one aperture in the bottom of the cell cup is closed by the resistance foil on the flat lower side of the housing,
    the resistance foil covers the at least one aperture and a region enclosing the at least one aperture,
    the resistance foil has at least one intended tear point that tears upon the first startup of the cell due to a pressure forming in the interior as a result of the beginning hydrogen or oxygen generation, and
    the resistance foil has at least one passage in the form of a hole or a slot in the region enclosing the aperture.

8. The cell according to claim 7, having at least one of:
    the at least one intended tear point is implemented as a punctiform or linear attenuation of the resistance foil,
    the attenuation is induced by perforation along an attenuation line,
    the attenuation is continuous and free of holes along an attenuation line,
    the intended tear point is implemented as a linear attenuation of the resistance foil having curved or circular geometry, and
    the intended tear point is implemented as a linear attenuation of the resistance foil along one or more straight lines.

9. The cell according to claim 7, having at least one of:
    the at least one passage comprises multiple holes and/or slots along a line, and
    the line is implemented along one or more straight lines having curved or circular geometry.

* * * * *